(12) United States Patent
Shudarek

(10) Patent No.: US 7,378,754 B2
(45) Date of Patent: May 27, 2008

(54) THREE-PHASE HARMONIC REDUCTION FILTER FOR BIDIRECTIONAL POWER CONVERTERS

(75) Inventor: Todd A. Shudarek, West Bend, WI (US)

(73) Assignee: MTE Corporation, Menomonee Falls, WI (US)

( * ) Notice: Subject to any disclaimer, the term of this patent is extended or adjusted under 35 U.S.C. 154(b) by 207 days.

(21) Appl. No.: 11/430,501

(22) Filed: May 9, 2006

(65) Prior Publication Data

US 2007/0263336 A1 Nov. 15, 2007

(51) Int. Cl.
*H02J 3/00* (2006.01)

(52) U.S. Cl. .................. 307/13; 307/104; 307/105

(58) Field of Classification Search ............. 307/13, 307/104, 105; 361/118; 333/177
See application file for complete search history.

(56) References Cited

U.S. PATENT DOCUMENTS

| | | | |
|---|---|---|---|
| 1,953,233 A | 4/1934 | Jonas | |
| 3,379,961 A | 4/1968 | Kobayashi et al. | |
| 3,440,516 A | 4/1969 | Kaiser | |
| 3,509,507 A | 4/1970 | Specht | |
| 3,535,542 A | 10/1970 | Gilsig | |
| 4,677,401 A | 6/1987 | Nonaka et al. | |
| 4,697,126 A | 9/1987 | Jarvinen et al. | |
| 4,710,735 A | 12/1987 | Blahous et al. | |
| 4,967,097 A | 10/1990 | Mehl | |
| 5,434,455 A | 7/1995 | Kammeter | |
| 5,499,178 A | 3/1996 | Mohan | |
| 5,619,080 A | 4/1997 | Pennington et al. | |
| 5,982,645 A | 11/1999 | Levran et al. | |
| 6,011,705 A | 1/2000 | Duca et al. | |
| 6,127,743 A | 10/2000 | Levin et al. | |
| 6,339,265 B1 | 1/2002 | Levin et al. | |
| 6,549,434 B2 | 4/2003 | Zhou et al. | |
| 6,605,882 B2 | 8/2003 | Boudrias et al. | |
| 6,844,794 B2 | 1/2005 | Lauri | |
| 2002/0105816 A1 | 8/2002 | Boudrias et al. | |
| 2003/0160515 A1 | 8/2003 | Yu et al. | |
| 2004/0183377 A1 | 9/2004 | Levin et al. | |
| 2004/0240237 A1 | 12/2004 | Okayama et al. | |
| 2005/0063202 A1 | 3/2005 | Stancu et al. | |

*Primary Examiner*—Michael Sherry
*Assistant Examiner*—Carlos Amaya
(74) *Attorney, Agent, or Firm*—Greenberg Traurig, LLP

(57) ABSTRACT

A three-phase filter has first, second, and third power source connectors and first, second, and third load connectors. A separate phase line filter is connected between each pair of power source and load connectors. Each phase line filter includes a line winding connected between the power source and load connectors for a phase line and includes a first shunt winding, resistor and capacitor connected in series between that load connector and the load connector for another phase line. The line and shunt windings for a given phase line filter are wound on a core in directions so that one winding produces magnetic flux having an opposite polarity to the magnetic flux produced by the other winding. The magnetic coupling of those windings, mitigates harmonic currents that otherwise flow in either direction between the power source and load connectors.

19 Claims, 2 Drawing Sheets

THREE-PHASE HARMONIC REDUCTION FILTER FOR BIDIRECTIONAL POWER CONVERTERS

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrical power distribution systems, and more particularly to filters for mitigating harmonic currents in such systems.

2. Description of the Related Art

Electrical loads are commonly controlled by power converters, such as adjustable speed drives for operating large electric motors, which convert AC power at one frequency to another frequency. Power converters for electric motors often are bidirectional so that when the motor is being driven by the mechanical load in a regenerative mode, the motor acts as a generator sending electrical current back through the power converter into the utility lines.

Non-linear electrical loads produce various levels of harmonic currents in the power distribution system with the harmonic frequency spectrum depending upon the nature of the load. The harmonic currents create many problems in the power distribution system, including increased total harmonic distortion voltage level, reduced power distribution equipment reliability, reduced electromagnetic compatibility of the loads, increased power losses, reduced power factor, and other problems which are well known to those skilled in the art.

Many apparatus have been proposed for mitigating harmonic currents. For example, filters were placed at the utility line connections to reduce the transmission of harmonics from the utility lines to the electrical load in the motoring mode and from the electrical load to the utility lines in the regenerative mode. However, conventional filters added an undesirable amount of reactance between the supply lines and the load.

SUMMARY OF THE INVENTION

A three-phase filter for mitigating harmonic currents in a power distribution system comprises a first, second, and third power source connectors, each for connection to a different phase line from a three-phase power source. A first load connector, a second load connector and a third load connector are provided for connection to a power consuming apparatus, such as a bidirectional power converter, for example. A magnetic core is formed of magnetically permeable material.

A first phase filter includes a first line winding connected between the first power source connector and the first load connector and wound on the magnetic core in an orientation that produces magnetic flux having a first polarity. A first shunt winding is wound on the magnetic core in an orientation that produces magnetic flux having a second polarity, opposite to the first polarity. A first resistor and a first capacitor are connected in series with the first shunt winding between the first load connector and the second load connector.

A second phase filter comprises a second line winding connected between the second power source connector and the second load connector and is wound on the magnetic core in an orientation that produces magnetic flux having the first polarity. A second shunt winding is wound on the magnetic core in an orientation that produces magnetic flux having the second polarity. A second resistor and a second capacitor are connected in series with the second shunt winding between the second load connector and the third load connector.

A third phase filter has a third line winding connected between the third power source connector and the third load connector and is wound on the magnetic core in an orientation that produces magnetic flux having the first polarity. A third shunt winding having one end wound on the magnetic core in an orientation that produces magnetic flux having the second polarity, a third resistor and a third capacitor connected in series with the third shunt winding between the third load connector and the first load connector.

The line and shunt windings of each phase filter are magnetically coupled in a manner that lessens the total reactance between the power source connector and the load connector for the associated electrical phase line. That coupling also provides a low impedance shunt path back to the load for high frequency harmonics in the regenerative mode of operation, while also providing sufficient phase line impedance for harmonic currents from the power source in the motoring mode of operation.

In a preferred embodiment, the magnetic core includes a pair of core bridges and first, second and third legs extending between the core bridges. The first line winding and the first shunt winding are both wound on the first leg, and preferably are wound in the same direction. The second line winding and the second shunt winding are both wound, preferably in the same direction, on the second leg, and the third line winding and the third shunt winding are both wound on the third leg, also preferably being wound in the same direction.

DETAILED DESCRIPTION OF THE INVENTION

Figure 1:
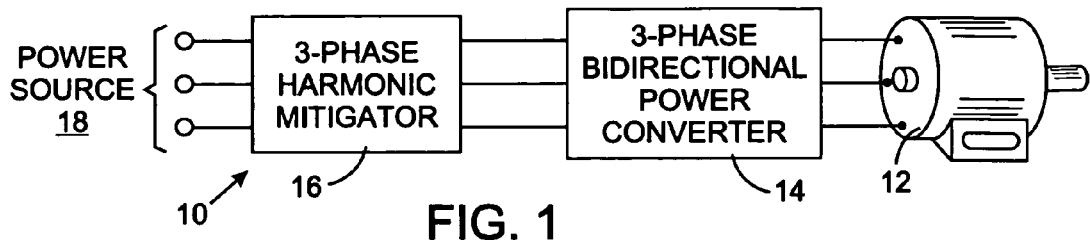
FIG. 1 is a block diagram of a harmonic mitigating filter connected between electrical utility lines and a power converter that operates a motor.

With initial reference to FIG. 1, a circuit 10 for controlling application of electricity to a load, such as a three-phase motor 12 includes a conventional bidirectional power converter 14. A three-phase filter 16 is provided to mitigate harmonic currents that otherwise flow between the three phase lines of power source 18 and the power converter 14.

Figure 2:
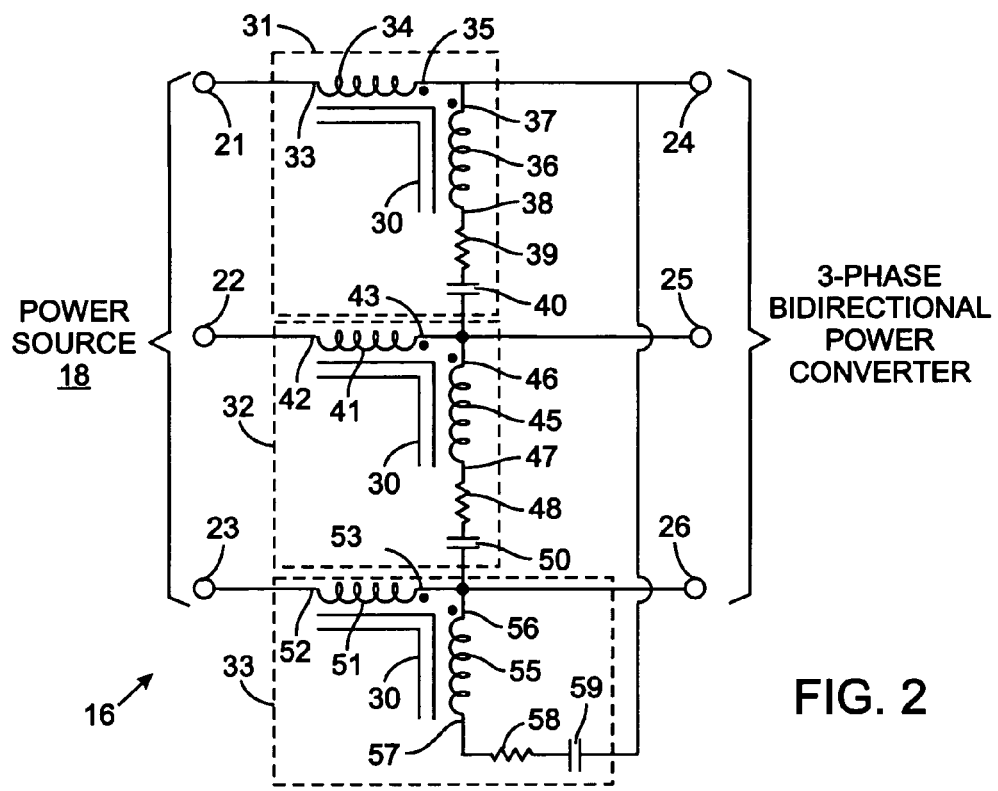
FIG. 2 is a schematic diagram of the harmonic mitigating filter.

With additional reference to FIG. 2, the three-phase filter 16 has first, second and third power source connectors 21, 22 and 23, respectively, to which the three lines of power source 18 are connected. The filter 16 also has first, second and third load connectors 24, 25 and 26 connected to the input terminals of the bidirectional power converter 14. The power source connectors and the load connectors may be terminals to which wires can be attached or they simply may be electrical leads extending from electrical windings of the filter that will be described.

A separate phase filter 31, 32 or 33 is connected between a source connector 21, 22 or 23 and the corresponding load connector 24, 25 or 26, respectively. The first phase filter 31 has a first line winding 34 wound on a core 30 of magnetically permeable material. The first line winding 34 has a first end 33 connected directly to the first source connector 21 and a second end 35 connected directly to the first load connector 24. The term "directly connected" as used herein means that the associated components are connected together by an electrical conductor without any intervening element, such as a resistor, capacitor, or inductor, which affects the transmission of current beyond the effects inherent in any electrical conductor. The first line winding 34 is wound about the core 30 in an orientation wherein the magnetic flux produced by that line winding has an instantaneous first polarity as designated by the dot at the second end 35 of the winding. A first shunt winding 36 has a third end 37 connected to the second end 35 of the first line winding 34 and is wound on the core 30 in an orientation wherein the resultant magnetic flux has an instantaneous second polarity opposite to the first polarity as designated by the dot at the third end 37 of the winding. A first resistor 39 and a first capacitor 40, connected in series, couple the fourth end 38 of the first shunt winding 36 to the second load connector 25. The resistor 39 improves the stability of the filter and prevents excessive current flow through the shunt branch.

The second phase filter 32 has a second line winding 41 wound on the core 30 with a fifth end 42, connected directly to the second source connector 22, and a sixth end 43, connected directly to the second load connector 25. The second line winding 41 is wound about the core 30 in an orientation wherein the magnetic flux produced by that line winding has the first polarity. A second shunt winding 45 has a seventh end 46 connected to the sixth end 43 of the second line winding 41 and wound on the core 30 in an orientation wherein the resultant magnetic flux has the second polarity. A second resistor 48 and a second capacitor 50 are connected in series between the eighth end 47 of the second shunt winding 45 and the third load connector 26.

The third phase filter 33 has a third line winding 51 wound on the core 30 with a ninth end 52 connected directly to the third source connector 23 and a tenth end 53 connected directly to the third load connector 26. The third line winding 51 is wound about the core 30 in an orientation wherein the magnetic flux produced by that line winding has the first polarity. A third shunt winding 55 has an eleventh end 56 connected to the tenth end 53 of the third line winding 51 and is wound on the core 30 so that the resultant magnetic flux has the second polarity. A third resistor 58 and a third capacitor 59, connected in series, couple the twelfth end 57 of the third shunt winding 55 to the first load connector 24.

Figure 3:
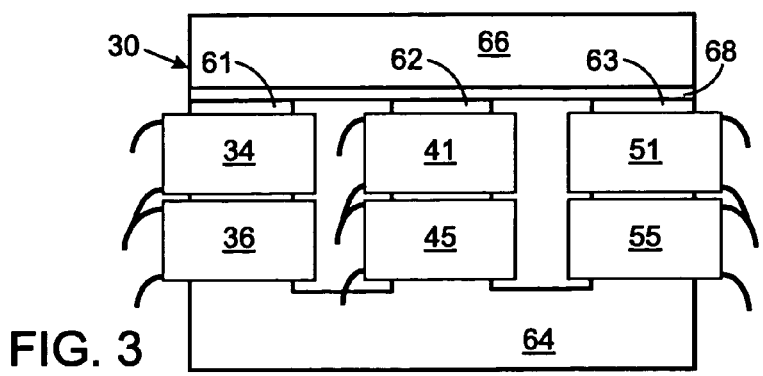
FIG. 3 illustrates one manner in which coils harmonic mitigating filter are wound on a magnetic core that has three legs.

Referring to FIG. 3, each combination of a line winding and a shunt winding for a phase filter 31,32 or 33 is wound on a different leg 61, 62 or 63 of the magnetic core 30. Specifically, the first line winding 34 and the first shunt winding 36 are wound in identical directions on the first leg 61, and the second line winding 41 and the second shunt winding 45 are wound in identical directions on the second leg 62. The third line winding 51 and the third shunt winding 55 are wound in identical directions on the third leg 63.

The three legs 61, 62 and 63 of the magnetic core 30 extend between a first core bridge 64 and a second core bridge 66. The first core bridge 64 in integral with the three legs forming a conventional "E" core segment. The second core bridge 66 is spaced from one end of each of the three legs 61-63 by a magnetic insulator 68, thereby forming a gap between each leg and the second bridge. The gap formed by the magnetic insulator 68 provides an impedance to the flux flowing between each leg and the second core bridge 66. Alternatively there could be another gap between each leg 61-63 and the first core bridge 64. The three legs 61-63 and the first and second core bridges 64 and 66 are formed by a series of abutting laminations as is well known for magnetic cores.

The line and shunt windings on each leg are magnetically coupled in a manner that reduces the total reactance between the power source connector and the load connector for the associated electrical phase line. That coupling provides a low impedance shunt path back to the load for high frequency harmonics in the regenerative mode of operation, while also providing sufficient phase line impedance for harmonics coming from the power source in the motoring mode of operation. The resonant frequency of the phase filters 31-33 is selected based on the switching frequency of the bidirectional power converter 14 and the frequencies of the harmonics produced by that converter in the motoring mode As a result of the line and shunt winding coupling, harmonic magnetic flux generated in the magnetic core 30 by the a given line winding 34, 41 or 51 has an opposite polarity to the harmonic magnetic flux produced by the associated shunt winding 36, 45 or 55, respectively, thereby resulting in at least a partial cancellation of the harmonic fluxes. The cancellation precludes at least a portion of the harmonic currents from flowing in either direction between the power source connectors 21-23 and the load connectors 24-26.

Figure 4:
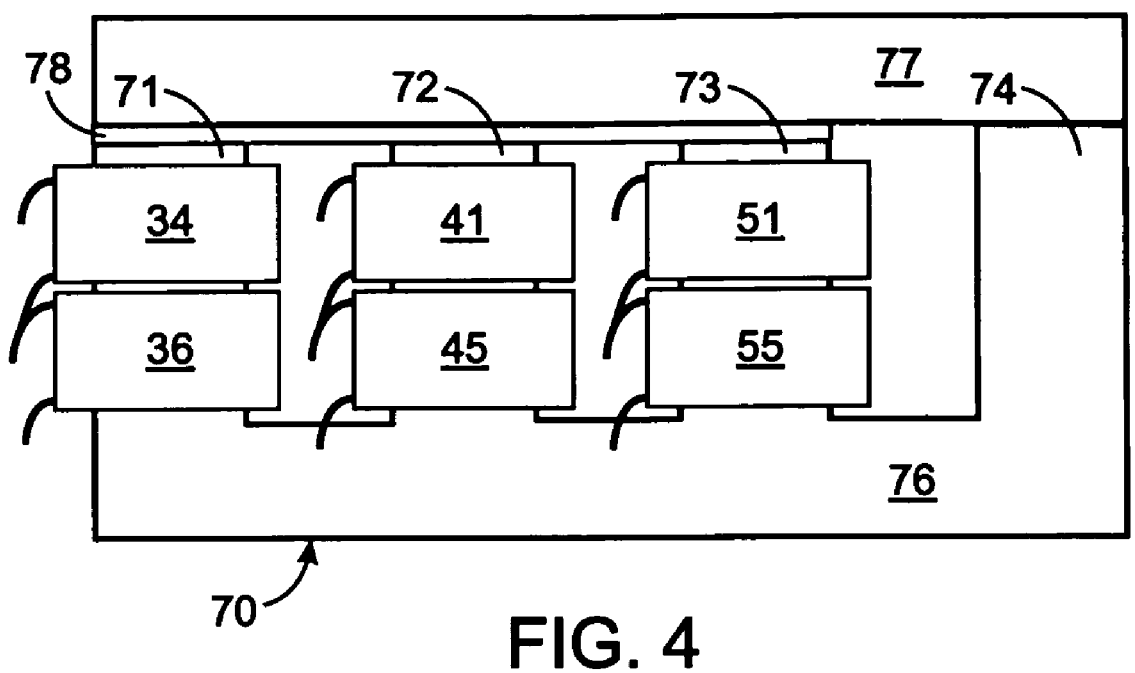
FIG. 4 illustrates another manner in which the coils are wound on a magnetic core that has four legs.

FIG. 4 illustrates a second embodiment of a core 70 for the three-phase harmonic mitigating filter. This second core 70 has four legs 71, 72, 73 and 74 with one end integral with and projecting from a first core bridge 76 toward a second core bridge 77 that extends across remote ends of those legs. The second core bridge 77 is spaced from the first, second and third legs 71-73 by a magnetic insulator 78, thereby forming an impedance gap between each of those legs and the second bridge. There is no gap or a very small gap between the fourth leg 74 and the second core bridge 77 so that there is negligible impedance there between. Alternatively, there could be another gap between each of the first, second and third legs 71-73 and the first core bridge 76.

The line winding and a shunt winding combination for each phase filter 31-33 is wound on a different leg 71, 72 or 73 of the magnetic core 70. Specifically, the first line winding 34 and the first shunt winding 36 are wound in identical directions on the first leg 71, and the second line winding 41 and the second shunt winding 45 are wound in identical directions on the second leg 72. The third line winding 51 and the third shunt winding 55 are wound in identical directions on the third leg 73. The fourth leg 74 is provided as a low reluctance flux path. This serves as a means to decouple each of the three phases thereby enhancing drive current regulator stability as may be needed by some motor drives Nothing is wound on the fourth leg, which serves to reduce stray fields by providing a flux return path.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A three-phase filter for mitigating harmonic currents in a power distribution system, said filter comprising:
a first power source connector, a second power source connector, an a third power source connector each for connection to a different phase line from a three-phase power source;
a first load connector, a second load connector and a third load connector for connection to a power consuming apparatus;
a magnetic core of a magnetically permeable material;
a first phase filter comprising a first line winding connected between the first power source connector and the first load connector and wound on the magnetic core in an orientation that produces magnetic flux having a first polarity, a first shunt winding wound on the magnetic core in an orientation that produces magnetic flux having a second polarity opposite to the first polarity, a first resistor and a first capacitor connected in series with the first shunt winding between the first load connector and the second load connector;
a second phase filter comprising a second line winding connected between the second power source connector and the second load connector and wound on the magnetic core in an orientation that produces magnetic flux having one polarity, a second shunt winding wound on the magnetic core in an orientation that produces magnetic flux having a opposite polarity to the one polarity, a second resistor and a second capacitor connected with the second shunt winding between the second load connector and the third load connector; and
a third phase filter comprising a third line winding connected between the third power source connector and the third load connector and wound on the magnetic core in an orientation that produces magnetic flux having a given polarity, a third shunt winding having one end wound on the magnetic core in an orientation that produces magnetic flux having an opposite polarity to the given polarity, a third resistor and a third capacitor connected in series with the third shunt winding between the third load connector and the first load connector.

2. The three-phase filter as recited in claim 1 wherein the magnetic core comprises:
a first core bridge;
a second core bridge spaced from the first core bridge; and
first, second and third legs extending between the first core bridge and the second core bridge.

3. The three-phase filter as recited in claim 2 wherein the magnetic core comprises a fourth leg extending between the first core bridge and the second core bridge.

4. The three-phase filter as recited in claim 2 wherein the magnetic core further comprises a gap between the first, second and third legs and the first core bridge.

5. The three-phase filter as recited in claim 2 wherein:
the first line winding and the first shunt winding are both wound in identical directions on the first leg;
the second line winding and the second shunt winding are both wound in identical directions on the second leg; and
the third line winding and the third shunt winding are both wound in identical directions on the third leg.

6. The three-phase filter as recited in claim 2 wherein:
the first line winding and the first shunt winding are wound on the first leg;
the second line winding and the second shunt winding are wound on the second leg; and
the third line winding and the third shunt winding are wound on the third leg.

7. The three-phase filter as recited in claim 6 wherein the magnetic core comprises a fourth leg extending between the first core bridge and the second core bridge.

8. The three-phase filter as recited in claim 7 wherein the magnetic core further comprises a gap between the first, second, third, and fourth legs and the first core bridge.

9. The three-phase filter as recited in claim 6 wherein the magnetic core further comprises a gap between the first, second, third, and fourth legs and the first core bridge.

10. A three-phase filter for mitigating harmonic currents produced in a power distribution system, said filter comprising:
a first power source connector, a second power source connector, and a third power source connector each for connection to a different phase line from a three-phase power source;
a first load connector, a second load connector and a third load connector for connection to a power consuming apparatus;
a magnetic core of a magnetically permeable material;
a first phase filter comprising a first line winding directly connected between the first power source connector and the first load connector and wound on the first magnetic core in an orientation that produces magnetic flux having a first polarity, a first shunt winding having one end directly connected to the first load connector and wound on the magnetic core in an orientation that produces magnetic flux having a second polarity opposite to the first polarity, a first resistor and a first capacitor connected in series between another end of the first shunt winding and the second load connector;
a second phase filter comprising a second line winding directly connected between the second power source connector and the second load connector and wound on the magnetic core in an orientation that produces magnetic flux having the first polarity, a second shunt winding having one end directly connected to the second load connector and wound on the magnetic core in an orientation that produces magnetic flux having the second polarity, a second resistor and a second capacitor connected in series between another end of the second shunt winding and the third load connector; and
a third phase filter comprising a third line winding directly connected between the third power source connector and the third load connector and wound on the magnetic core in an orientation that produces magnetic flux having the first polarity, a third shunt winding having one end directly connected to the third load connector and wound on the magnetic core in an orientation that produces magnetic flux having the second polarity, a third resistor and a third capacitor connected in series between another end of the third shunt winding and the first load connector.

11. The three-phase filter as recited in claim 10 wherein the magnetic core comprises:

a first core bridge;

a second core bridge spaced from the first core bridge; and first, second and third legs extending between the first core bridge and the second core bridge.

12. The three-phase filter as recited in claim 11 wherein the magnetic core comprises a fourth leg extending between the first core bridge and the second core bridge.

13. The three-phase filter as recited in claim 11 wherein the magnetic core further comprises a gap between the first, second and third legs and the first core bridge.

14. The three-phase filter as recited in claim 11 wherein:

the first line winding and the first shunt winding are wound on the first leg;

the second line winding and the second shunt winding are wound on the second leg; and the third line winding and the third shunt winding are wound on the third leg.

15. A three-phase filter for mitigating harmonic currents produced in a power distribution system, said filter comprising:

a first power source connector, a second power source connector, an a third power source connector each for connection to a different phase line from a three-phase power source;

a first load connector, a second load connector and a third load connector for connection to a power consuming apparatus;

a magnetic core of a magnetically permeable material having a first bridge, a second bridge and three legs extending between the first bridge and the second bridge;

a first phase filter comprising a first line winding directly connected between the first power source connector and the first load connector and wound on the first leg of the magnetic core in an orientation that produces magnetic flux having a first polarity, a first shunt winding having one end directly connected to the first load connector and wound on the first leg in an orientation that produces magnetic flux having a second polarity opposite to the first polarity, a first resistor and a first capacitor connected in series between another end of the first shunt winding and the second load connector;

a second phase filter comprising a second line winding directly connected between the second power source connector and the second load connector and wound on the second leg of the magnetic core in an orientation that produces magnetic flux having the first polarity, a second shunt winding having one end directly connected to the second load connector and wound on the second leg in an orientation that produces magnetic flux having the second polarity, a second resistor and a second capacitor connected in series between another end of the second shunt winding and the third load connector; and a third phase filter comprising a third line winding directly connected between the third power source connector and the third load connector and wound on the third leg of the magnetic core in an orientation that produces magnetic flux having the first polarity, a third shunt winding having one end directly connected to the third load connector and wound on the third leg in an orientation that produces magnetic flux having the second polarity, a third resistor and a third capacitor connected in series between another end of the third shunt winding and the first load connector.

16. The three-phase filter as recited in claim 15 wherein the magnetic core further comprises a gap between the first, second, and third legs and the first core bridge.

17. The three-phase filter as recited in claim 15 wherein the magnetic core comprises a fourth leg extending between the first core bridge and the second core bridge.

18. The three-phase filter as recited in claim 17 wherein the magnetic core further comprises a gap between the first, second, third, and fourth legs and the first core bridge.

19. The three-phase filter as recited in claim 15 wherein:

the first line winding and the first shunt winding are both wound in identical directions on the first leg;

the second line winding and the second shunt winding are both wound in identical directions on the second leg; and the third line winding and the third shunt winding are both wound in identical directions on the third leg.

* * * * *